United States Patent
Wan et al.

(10) Patent No.: US 10,807,145 B2
(45) Date of Patent: Oct. 20, 2020

(54) DEVICE AND METHOD FOR FORMING INSIDE THREE-DIMENSIONAL FINNED TUBE BY MULTI-EDGE PLOUGHING AND EXTRUDING

(71) Applicant: South China University of Technology, Guangzhou (CN)

(72) Inventors: Zhenping Wan, Guangzhou (CN); Shufeng Huang, Guangzhou (CN); Shuiping Zou, Guangzhou (CN); Longsheng Lu, Guangzhou (CN); Yong Tang, Guangzhou (CN)

( * ) Notice: Subject to any disclaimer, the term of this patent is extended or adjusted under 35 U.S.C. 154(b) by 191 days.

(21) Appl. No.: 16/153,777

(22) Filed: Oct. 7, 2018

(65) Prior Publication Data
US 2019/0039115 A1   Feb. 7, 2019

Related U.S. Application Data (63) Continuation of application No. PCT/CN2017/109917, filed on Nov. 8, 2017.

(30) Foreign Application Priority Data

Nov. 10, 2016 (CN) .......................... 2016 1 0988108

(51) Int. Cl.
*B21D 53/06* (2006.01)
*F28F 1/40* (2006.01)
(Continued)

(52) U.S. Cl.
CPC ............ *B21D 53/06* (2013.01); *B21C 37/207* (2013.01); *B21D 53/085* (2013.01); *B23P 15/26* (2013.01);
(Continued)

(58) Field of Classification Search
CPC .... B21D 53/06; B21D 53/085; B21C 37/207; B21C 37/22; B23P 15/26; F28F 21/081; F28F 1/36; F28F 1/40; F28F 1/426
See application file for complete search history.

(56) References Cited

U.S. PATENT DOCUMENTS 3,630,058 A    12/1971 Reed et al.
3,938,374 A *  2/1976 Wadsworth, Jr. ....... B21C 37/20
                                                    72/104
(Continued)

FOREIGN PATENT DOCUMENTS

CA         1036804 A      8/1978
CN         1887490 A      1/2007
(Continued)

OTHER PUBLICATIONS

Internation Search Report of PCT/CN2017/109917, dated Feb. 14, 2018.

*Primary Examiner* — Lee A Holly
(74) *Attorney, Agent, or Firm* — Erson IP (Nelson IP)

(57) ABSTRACT

A device for forming inside three-dimensional finned tube by multi-edge ploughing and extruding, comprises a machine frame, a machine head, a supporting mechanism, an axial feeding mechanism and a cutter assembly for forming inside fins. The machine head, the supporting mechanism and the axial feeding mechanism are axially mounted on the machine frame in sequence. The cutter assembly for forming inside fins is mounted on the feeding mechanism. One end of a metal tube to be machined for forming inside three-dimensional fins is clamped on a chunk of a rotary main shaft of the machine head, and the other end thereof is placed on the supporting mechanism. The rotary main shaft of the machine head provides the rotation power for the metal tube, and the axial feeding mechanism drives
(Continued)

the cutter assembly to move linearly along a coaxial line of the metal tube and the cutter assembly.

7 Claims, 5 Drawing Sheets

(51) Int. Cl.
| | |
|---|---|
| *B23P 15/26* | (2006.01) |
| *F28F 21/08* | (2006.01) |
| *F28F 1/36* | (2006.01) |
| *B21D 53/08* | (2006.01) |
| *B21C 37/20* | (2006.01) |
| *F28F 1/42* | (2006.01) |
| *B21C 37/22* | (2006.01) |

(52) U.S. Cl.
CPC ............. *F28F 1/36* (2013.01); *F28F 21/081* (2013.01); *B21C 37/22* (2013.01); *F28F 1/40* (2013.01); *F28F 1/426* (2013.01)

(56) References Cited

U.S. PATENT DOCUMENTS

| | | | |
|---|---|---|---|
| 6,478,310 B1* | 11/2002 | Azami | B23B 31/1622 |
| | | | 279/4.02 |
| 6,760,972 B2* | 7/2004 | Zifferer | B21C 37/207 |
| | | | 29/890.048 |
| 7,451,542 B2 | 11/2008 | Brand et al. | |
| 7,509,828 B2 | 3/2009 | Thors et al. | |
| 2006/0213346 A1* | 9/2006 | Thors | B21C 37/20 |
| | | | 83/178 |

FOREIGN PATENT DOCUMENTS

| | | |
|---|---|---|
| CN | 100347512 C | 11/2007 |
| CN | 102069105 A | 5/2011 |
| CN | 102441775 A | 5/2012 |
| CN | 102921765 A | 2/2013 |
| CN | 106391913 A | 2/2017 |
| CN | 206215803 U | 6/2017 |
| DE | 8528705 U1 | 1/1986 |
| FR | 2590816 B1 | 5/1994 |

* cited by examiner

DEVICE AND METHOD FOR FORMING INSIDE THREE-DIMENSIONAL FINNED TUBE BY MULTI-EDGE PLOUGHING AND EXTRUDING

CROSS-REFERENCE TO RELATED APPLICATIONS

This application is a continuation of International Patent Application No. PCT/CN2017/109917 with a filing date of Nov. 8, 2017, designating the United States, now pending, and further claims priority to Chinese Patent Application No. 201610988108.5 with a filing date of Nov. 10, 2016. The content of the aforementioned applications, including any intervening amendments thereto, are incorporated herein by reference.

TECHNICAL FIELD

The disclosure relates to a device and method for fin preparation, and particularly to a device and method for forming an inside three-dimensional finned tube by multi-edge ploughing and extruding.

BACKGROUND OF THE PRESENT INVENTION

With the continuous development of the society, the problem of energy shortage has become increasingly serious. As an important energy conservation way, technologies for heat transfer enhancement, which are of great significance for solving the energy problem, have been widely applied in petroleum, chemical industry, force, nuclear power and refrigeration fields. The main characteristic of the heat exchange tube, one of the key elements used in heat transfer enhancement technology, lies in a certain surface structure machined on the inner and outer surfaces of the tube, so as to expend the transfer surface or increase the coefficient of heat transfer and further improve the heat transfer efficiency.

The heat exchange tubes used in prior art are mainly outside finned tubes with smooth inner wall, or inner wall with threaded grooves or spur gear grooves. However, these structures have limited effects on the expansion of the heat transfer surfaces, and the structures of the fins and the shapes of the expansion surface with threaded grooves or spur gear grooves are too regular to disturb the boundary layer of the fluid passing therethrough, causing limited improvements to the heat transfer coefficient. Obviously, it is hard for outside finned tubes with smooth inner wall, or inner wall with threaded grooves or spur gear grooves to reach higher heat transfer efficiency.

SUMMARY OF PRESENT INVENTION

In order to overcome the technical deficiencies and shortcomings above, an object of the present disclosure is to provide a simple and convenient device and method for forming an inside three-dimensional finned tube by multi-edge ploughing and extruding, so as to produce a heat transfer tube with discontinuous outside three-dimensional finned structure, for enlarging the contact area between the fins and a working medium and improving the heat transfer efficiency.

The object of the disclosure is realized by the following technical solutions:

A device for forming an inside three-dimensional finned tube by multi-edge ploughing and extruding comprises: a machine frame, a machine head capable of providing rotation power, a supporting mechanism, an axial feeding mechanism and a cutter assembly for forming inside fins; the machine head, the supporting mechanism and the axial feeding mechanism are axially mounted on the machine frame in sequence; the cutter assembly for forming inside fins is mounted on the feeding mechanism; one end of a metal tube to be machined for forming inside three-dimensional fins is clamped on a chunk of a rotary main shaft of the machine head, and the other end thereof is placed on the supporting mechanism; the metal tube is coaxial with the cutter assembly for forming inside fins; the rotary main shaft of the machine head provides the rotation power for the metal tube; and the axial feeding mechanism drives the cutter assembly for forming the inside fins to move linearly along a coaxial line of the metal tube and the cutter assembly for forming inside fins.

Advantageously, the supporting mechanism includes a support defined with a working position for placing the metal tube, and three clamping cylinders are symmetrically distributed on the support; a claw is mounted at an end of a piston of each clamping cylinder, and a rotatable roller is mounted at an end of each claw; rollers are symmetrically distributed around the working position; and when the metal tube is placed into the working position, rollers are in rolling contact with a circumference of the metal tube, for providing support and positioning for the rotating mental pipe.

Advantageously, the cutter assembly for forming inside fins comprises a multi-edge cutter, a handle and a connecting rod; and the multi-edge cutter is mounted on one end of the handle and the other end of the handle is inserted into a front end of the connecting rod, and a rear end of the connecting rod (6-2) is fixed to the feeding mechanism.

Advantageously, the axial feeding mechanism is a lead screw feeding mechanism, which comprises a lead screw and a slider mounted on the lead screw; when the lead screw is rotated, the slider is driven to move axially; and the connecting rod (is fixed on the slider.

Advantageously, the front end of the connecting rod is in a cylindrical structure with an annular permanent magnet sleeved therein; a convex bar is defined on the handle, and a slot corresponding to the convex bar is defined on the front end of the connecting rod; when the handle is inserted into the connecting rod, the convex bar and the slot limit the handle to move circumferentially relative to the connecting rod; and under a magnetic force of the annular permanent magnet, the handle is attracted to the connecting rod.

Advantageously, the multi-edge cutter is fixed on the front end of the connecting rod by a nut.

Advantageously, all of edges of the multi-edge cutter are in the same conical structure with a taper degree of 10°~30°, and the edges are symmetrically distributed around an annular base; an extracting mechanism for extract the handle is mounted at a left side of the machine head, and comprises a cylinder and a pneumatic chuck arranged at an end of a piston of the cylinder; and the piston of the cylinder is retracted after the pneumatic chuck clamps an end of the handle so as to extract the handle axially from the connecting rod.

A method for forming inside finned tube comprises following steps:

S1: placing the metal tube with an internal threaded structure into the working position of the supporting mechanism axially, wherein an end of the metal tube is fixed on a chunk of a rotary main shaft of the machine head, and keeping the metal tube being coaxial with the multi-edge cutter;

S2: driving the metal tube (to rotate by the rotary main shaft of the machine head;

S3: starting the axial feeding mechanism to drive the multi-edge cutter to move continuously and axially toward the metal tube, wherein when the multi-edge cutter enters the metal tube, the edges of the multi-edge cutter cut a raised part of the internal threaded structure simultaneously to divide the raised part into two parts; an arc edge of the edge ploughs to form a groove and a conical rear cutter surface extrudes the groove outwards simultaneously, for expanding the groove and forming a discontinuous inside three-dimensional fins higher than the raised part of the internal threaded structure; and S4: keeping the axial feeding mechanism feeding until the discontinuous inside three-dimensional fins are formed in the entire side wall of the metal tube.

After the discontinuous inside three-dimensional fins are formed in the entire side wall of the metal tube, the multi-edge cutter extends out of an end of the metal tube, the machine head stops rotating and the axial feeding mechanism stops feeding, and then the pneumatic chuck of the extracting mechanism clamps the end of the handle and the handle is extracted axially from the connecting rod with the retraction of the piston in the cylinder, and then the axial feeding mechanism moves backward to an initial position.

Compared with the prior art, the method and device according to the present disclosure have the following advantageous and effects:

Under the combination of the axial feeding mechanism and the multi-edge cutter, the multiple edges of the multi-edge cutter cut a raised part of the internal threaded structure simultaneously to divide the raised part into two parts. The front cutter surface of the edge ploughs to form a groove and the rear cutter surface extrudes the groove outwards simultaneously for expanding the groove and forming discontinuous inside three-dimensional fins higher than the raised part of the internal threaded structure. The finned tube with this inside fins structure has a large contact area between the finned tube and a working medium, increases the turbulent flow effect on the working medium, has a large heat transfer surface area, increases the coefficient of heat transfer, and hence effectively improves the heat transfer efficiency of an enhanced tube.

Adopting a multi-edge processing technology, the processing efficiency of the finned tube is improved effectively.

The front end of the connecting rod is in a cylindrical structure with an annular permanent magnet sleeved therein, a convex bar is defined on the handle, and a slot corresponding to the convex bar is defined on the front end of the connecting rod. When the handle is inserted into the connecting rod, the convex bar and the slot limit the handle to move circumferentially relative to the connecting rod. Under a magnetic force of the annular permanent magnet, the handle is attracted to the connecting rod. The way of plugging and magnetic attraction makes installation and dismantling more convenient and quickly, and when further combined with the extracting mechanism, it can effectively reduce the clamping time, improve the production efficiency and reduce the production cost.

DETAILED DESCRIPTION OF PREFERRED EMBODIMENTS

The present disclosure is further described below in detail with reference to preferred embodiments.

Referring to FIG. 1 to FIG. 5, the device for forming an inside three-dimensional finned tube by multi-edge ploughing and extruding provided in the disclosure comprises a machine frame 1, a machine head 3 capable of providing rotation power, a supporting mechanism 4, an axial feeding mechanism 5 and a cutter assembly for forming inside fins.

Figure 1:
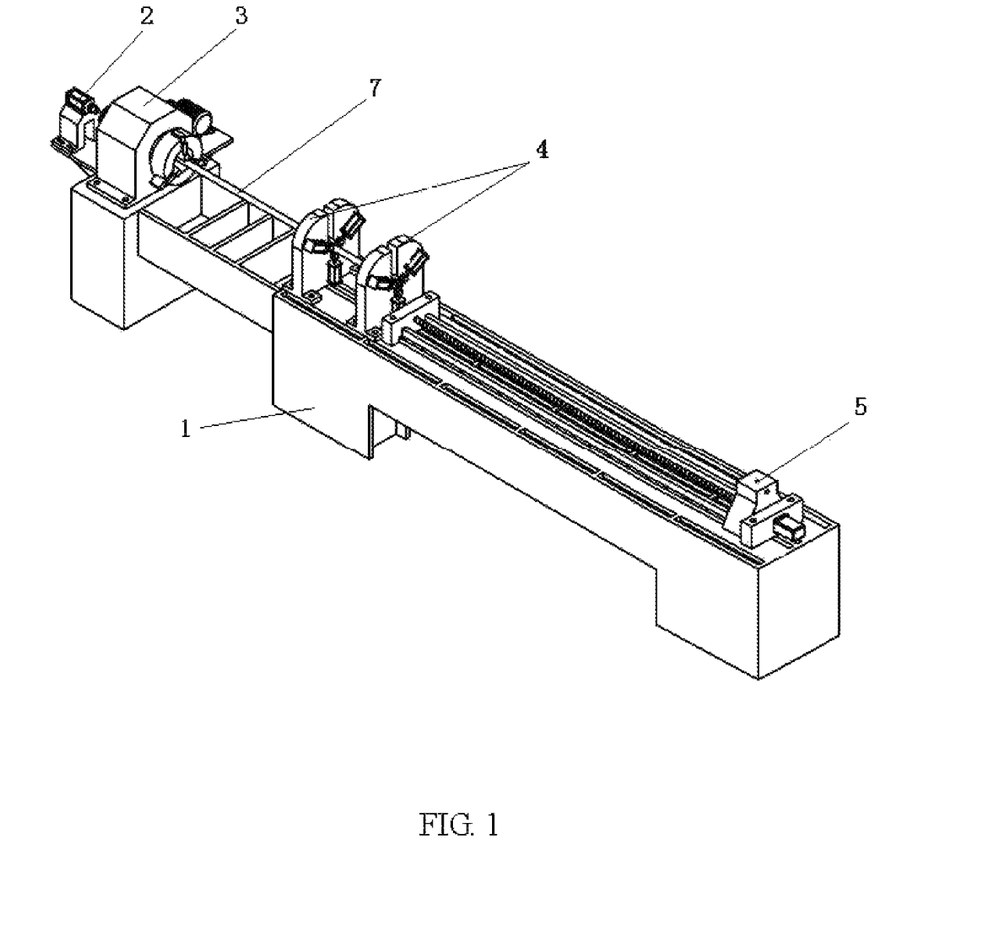
FIG. 1 is a structural diagram of a device for forming an inside three-dimensional finned tube by multi-edge ploughing and extruding according to present disclosure.

The machine head 3, the supporting mechanism 4 and the axial feeding mechanism 5 are axially mounted on the machine frame 1 in sequence. The cutter assembly for forming inside fins is mounted on the feeding mechanism 5.

One end of a metal tube 7 to be machined for forming inside three-dimensional fins is clamped on a chunk of a rotary main shaft of the machine head 3, and the other end thereof is placed on the supporting mechanism 4; the metal tube 7 is coaxial with the cutter assembly for forming inside fins; the rotary main shaft of the machine head 3 provides rotation power for the metal tube 7; and the axial feeding mechanism 5 drives the cutter assembly for forming the inside fins to move linearly along the coaxial line of the metal tube 7 and the cutter assembly for forming inside fins.

Figure 2:
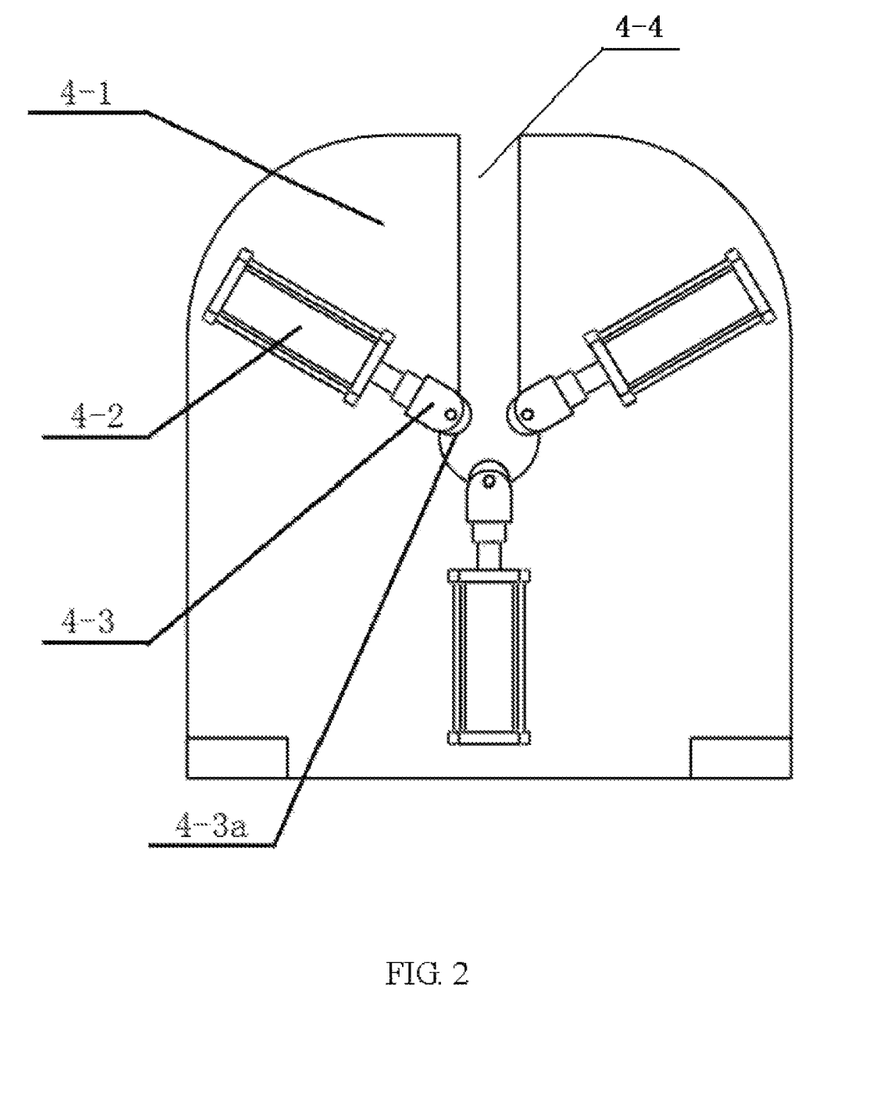
FIG. 2 is a partial structural diagram of a supporting mechanism of a metal tube.

The supporting mechanism 4 includes a support 4-1 defined with a working position 4-4 for placing the metal tube 7. Three clamping cylinders 4-2 are symmetrically distributed on the support 4-1. A claw 4-3 is mounted at an end of a piston of each clamping cylinder, and a rotatable roller 4-3a is mounted at an end of each claw 4-3. These rollers 4-3a are symmetrically distributed around the working position 4-4. When the metal tube 7 is placed into the working position 4-4, the rollers 4-3a are in rolling contact with a circumference of the metal tube 7, for providing support and positioning for the rotating mental pipe 7.

Figure 3:
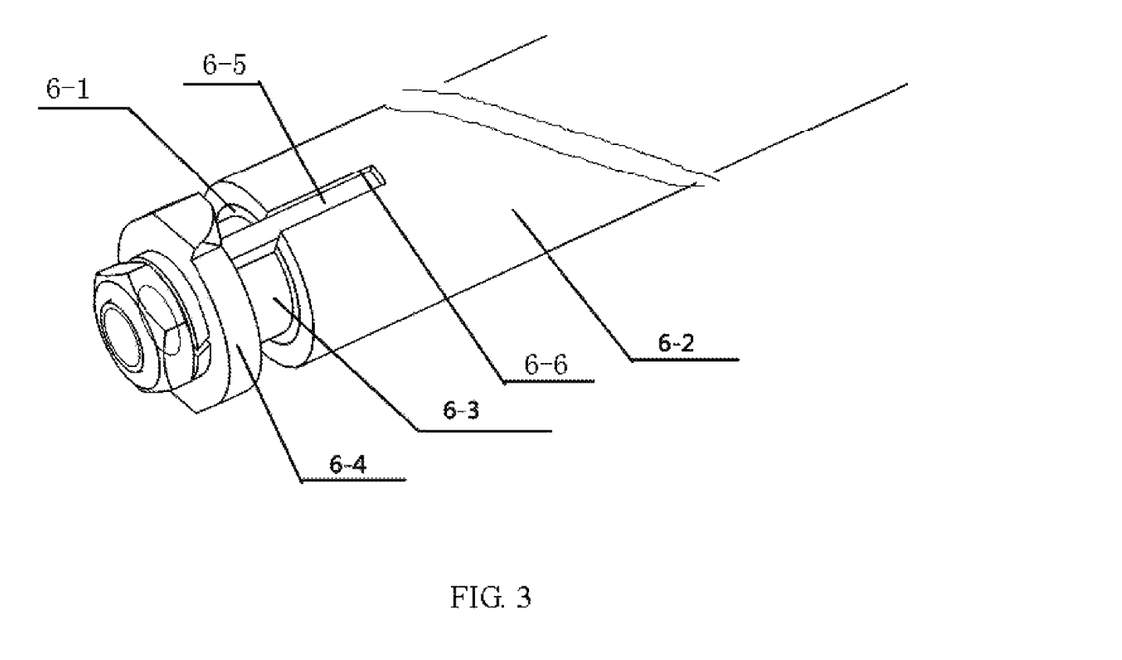
FIG. 3 is a partial structural diagram of a cutter assembly for forming inside fins.

The cutter assembly for forming inside fins comprises a multi-edge cutter 6-4, a handle 6-3 and a connecting rod 6-2. The multi-edge cutter 6-4 is mounted on one end of the handle 6-3 and the other end of the handle 6-3 is inserted into a front end of the connecting rod 6-2, and a rear end of the connecting rod 6-2 is fixed to the feeding mechanism 5.

The axial feeding mechanism 5 is a lead screw feeding mechanism, which comprises a lead screw and a slider mounted on the lead screw. When the lead screw is rotated, the slider is driven to move axially. The connecting rod 6-2 is fixed on the slider.

The front end of the connecting rod 6-2 is in a cylindrical structure with an annular permanent magnet 6-1 sleeved therein. A convex bar 6-5 is defined on the handle 6-3, and a slot 6-6 corresponding to the convex bar 6-5 is defined on the front end of the connecting rod 6-2. When the handle 6-3 is inserted into the connecting rod 6-2, the convex bar 6-5 and the slot 6-6 limit the handle 6-3 to move circumferentially relative to the connecting rod 6-2. Under a magnetic force of the annular permanent magnet, the handle 6-3 is attracted to the connecting rod 6-2.

The multi-edge cutter 6-4 is fixed on the front end of the connecting rod 6-2 by a nut.

Figure 4:
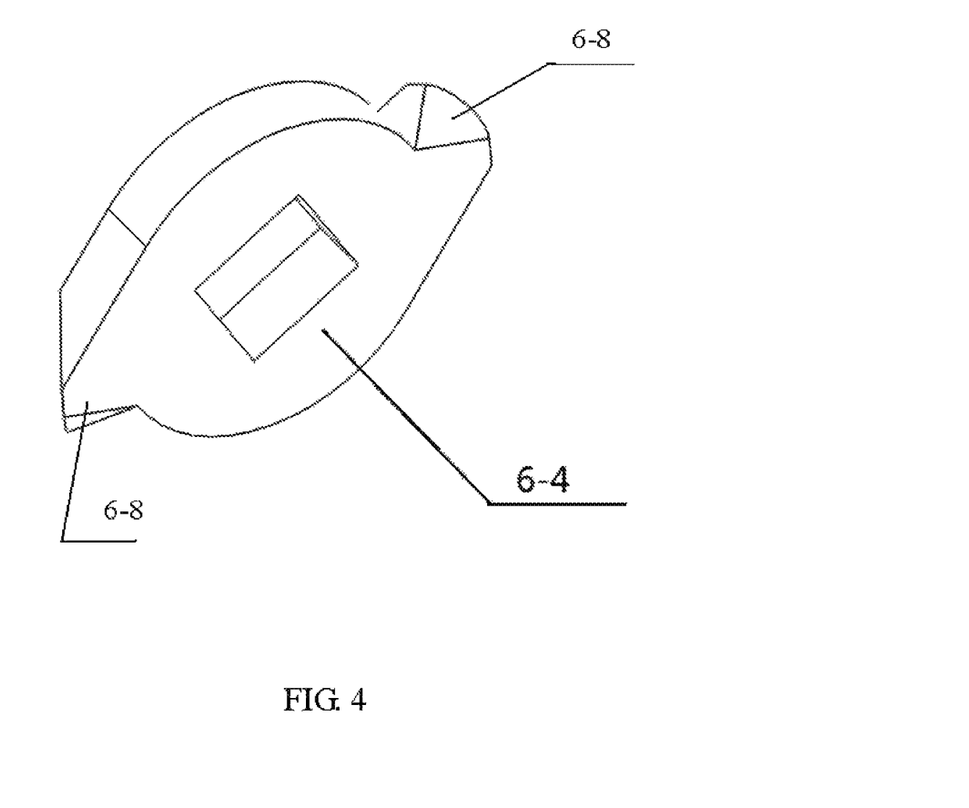
FIG. 4 is a partial structural diagram of a multi-edge cutter.

All of edges 6-8 of the multi-edge cutter 6-4 are in the same conical structure with a taper degree of 10°~30°, and the edges 6-8 are symmetrically distributed around an annular base. The number and taper degree of the edges 6-8 can be determined according to the processing requirements.

Figure 5:
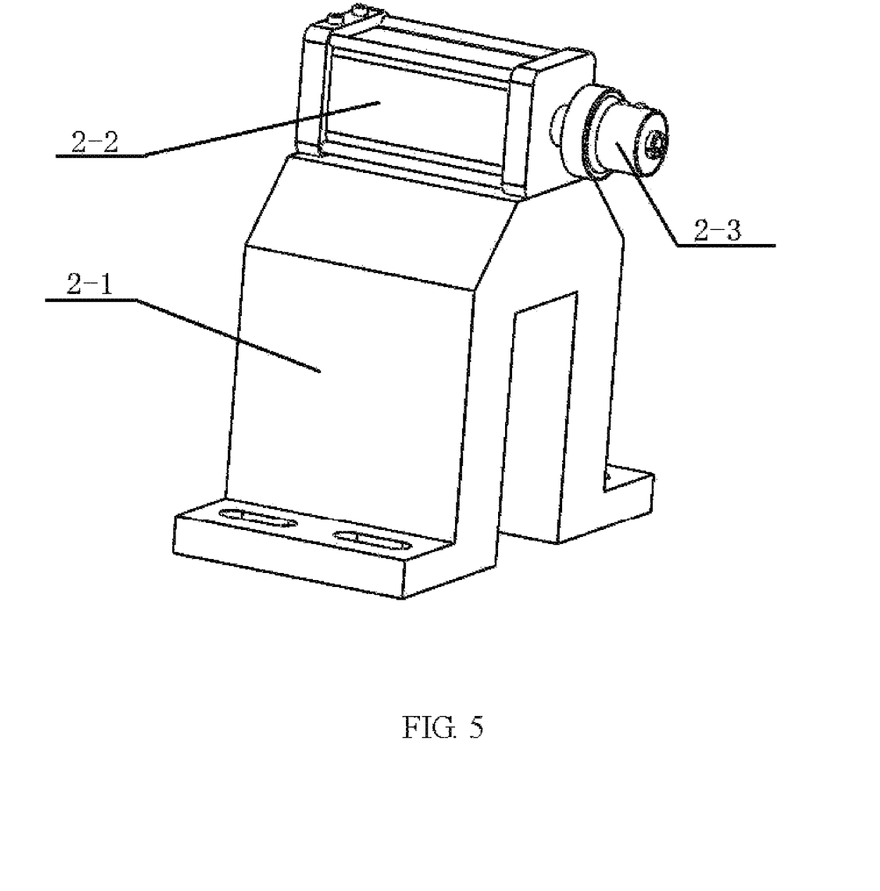
FIG. 5 is a partial structural diagram of an extracting mechanism.

An extracting mechanism 2 for extract the handle 6-3 is mounted at a left side of the machine head 3, and comprises a cylinder 2-2 and a pneumatic chuck 2-3 arranged at an end of a piston of the cylinder 2-2. And the piston of the cylinder 2-2 is retracted after the pneumatic chuck 2-3 clamps an end of the handle 6-3 so as to extract the handle 6-3 axially from the connecting rod 6-2.

The method for forming an inside finned tube provided in the disclosure can be realized by following steps:

S1: placing the metal tube 7 with an internal threaded structure into the working position 4-4 of the supporting mechanism 4 axially, wherein an end of the metal tube 7 is fixed on a chunk of a rotary main shaft of the machine head 3, and keeping the metal tube 7 being coaxial with the multi-edge cutter 6-4; it should be noted that the spiral direction of the internal thread in the metal tube 7 may be the same or reversed as the feeding direction of the multi-edge cutter 6-4, depending on the actual application;

S2: driving the metal tube 7 to rotate by the rotary main shaft of the machine head 3;

S3: starting the axial feeding mechanism 5 to drive the multi-edge cutter 6-4 to move continuously and axially toward the metal tube 7, wherein the edges 6-8 of the multi-edge cutter 6-4 cut the raised part of the internal threaded structure simultaneously to divide the raised part into two parts when the multi-edge cutter 6-4 enters the metal tube 7; an arc edge of the edge 6-8 ploughs to form a groove and a conical rear cutter surface extrudes the groove outwards simultaneously, for expanding the groove and forming a discontinuous inside three-dimensional fins higher than the raised part of the internal threaded structure; and S4: keeping the axial feeding mechanism 5 feeding until the discontinuous inside three-dimensional fins are formed in the entire side wall of the metal tube 7.

The method for extracting the cutter comprises as following steps:

1. After the discontinuous inside three-dimensional fins are formed in the entire side wall of the metal tube 7, extending the multi-edge cutter 6-4 out of and end of the metal tube 7;

2. Stopping the machine head 3 and the axial feeding mechanism 5;

3. Retracting the piston of the cylinder 2-2 after the pneumatic chuck 2-3 of the extracting mechanism 2 clamps the end of the handle 6-3 and extracting the handle 6-3 axially from the connecting rod 6-2; and 4. Moving the axial feeding mechanism 5 backward to the initial position.

As described above, the present disclosure can be well-implemented.

The protection scope of the present invention should not be limited to the embodiments set forth herein, and any other changes, modifications, substitutions, combinations, and simplifications without departing from the spirits and principles of this disclosure are a kind of equivalent of the present disclosure and fall into the scope of the appended claims.

We claim:

1. A device for forming an inside three-dimensional finned tube by multi-edge ploughing and extruding, comprising: a machine frame (1), a machine head (3) capable of providing rotation power, a supporting mechanism (4), an axial feeding mechanism (5) and a cutter assembly for forming inside fins;

wherein the machine head (3), the supporting mechanism (4) and the axial feeding mechanism (5) are axially mounted on the machine frame (1) in sequence; the cutter assembly for forming inside fins is mounted on the axial feeding mechanism (5); one end of a metal tube (7) to be machined for forming inside three-dimensional fins is clamped on a chunk of a rotary main shaft of the machine head (3), and the other end thereof is placed on the supporting mechanism (4); the metal tube (7) is coaxial with the cutter assembly for forming inside fins; the rotary main shaft of the machine head (3) provides the rotation power for the metal tube (7); and the axial feeding mechanism (5) drives the cutter assembly for forming inside fins to move linearly along a coaxial line of the metal tube (7) and the cutter assembly for forming inside fins;

wherein the cutter assembly for forming inside fins comprises a multi-edge cutter (6-4), a handle (6-3) and a connecting rod (6-2); and the multi-edge cutter (6-4) is mounted on one end of the handle (6-3) and the other end of the handle (6-3) is inserted into a front end of the connecting rod (6-2), and a rear end of the connecting rod (6-2) is fixed to the feeding mechanism (5);

wherein a convex bar (6-5) is defined on the handle (6-3); the front end of the connecting rod (6-2) is in a cylindrical structure with an annular permanent magnet (6-1) sleeved therein, and a slot (6-6) corresponding to the convex bar (6-5) is defined on the front end of the connecting rod (6-2); when the handle (6-3) is inserted into the connecting rod (6-2), the convex bar (6-5) and the slot (6-6) limit the handle (6-3) to move circumferentially relative to the connecting rod (6-2); under a magnetic force of the annular permanent magnet, the handle (6-3) is attracted to the connecting rod (6-2).

2. The device according to claim 1, wherein all of edges (6-8) of the multi-edge cutter (6-4) are in the same conical structure with a taper degree of 10°~30°, and the edges (6-8) are symmetrically distributed around an annular base.

3. The device according to claim 2, wherein an extracting mechanism (2) for extract the handle (6-3) is mounted at a left side of the machine head (3), and comprises a cylinder (2-2) and a pneumatic chuck (2-3) arranged at an end of a piston of the cylinder (2-2); and the piston of the cylinder (2-2) is retracted after the pneumatic chuck (2-3) clamps an end of the handle (6-3) so as to extract the handle (6-3) axially from the connecting rod (6-2).

4. The device according to claim 1, wherein the supporting mechanism (4) includes a support (4-1) defined with a working position (4-4) for placing the metal tube (7); three clamping cylinders (4-2) are symmetrically distributed on the support (4-1); a claw (4-3) is mounted at an end of a piston of each clamping cylinder (4-2), and a rotatable roller (4-3a) is mounted at an end of each claw (4-3); rollers (4-3a) are symmetrically distributed around the working position (4-4); and when the metal tube (7) is placed into the working position (4-4), rollers (4-3a) are in rolling contact with a circumference of the metal tube (7), for providing support and positioning for the rotating metal tube (7).

5. The device according to claim 1, wherein the axial feeding mechanism (5) is a lead screw feeding mechanism, which comprises a lead screw and a slider mounted on the lead screw; when the lead screw is rotated, the slider is driven to move axially; and the connecting rod (6-2) is fixed on the slider.

6. The device according to claim 1, wherein the multi-edge cutter (6-4) is fixed on the front end of the connecting rod (6-2) by a nut.

7. A method for forming inside three-dimensional finned tube, realized by adopting the device according to claim 3, and comprising following steps:
1) placing the metal tube (7) with an internal threaded structure into the working position (4-4) of the supporting mechanism (4) axially, wherein an end of the metal tube (7) is fixed on a chunk of a rotary main shaft of the machine head (3), and keeping the metal tube (7) being coaxial with the multi-edge cutter (6-4);
2) driving the metal tube (7) to rotate by the rotary main shaft of the machine head (3);
3) starting the axial feeding mechanism (5) to drive the multi-edge cutter (6-4) to move continuously and axially toward the metal tube (7, wherein the edges (6-8) of the multi-edge cutter (6-4) cut a raised part of the internal threaded structure simultaneously to divide the raised part into two parts when the multi-edge cutter (6-4) enters the metal tube (7); an arc edge of the edge (6-8) ploughs to form a groove and a conical rear cutter surface extrudes the groove outwards simultaneously, for expanding the groove and forming a discontinuous inside three-dimensional fins higher than the raised part of the internal threaded structure; and
4) keeping the axial feeding mechanism (5) feeding until the discontinuous inside three-dimensional fins are formed in the entire side wall of the metal tube (7);
after the discontinuous inside three-dimensional fins are formed in the entire side wall of the metal tube (7), extending the multi-edge cutter (6-4) out of an end of the metal tube (7); stopping the machine head (3) and the axial feeding mechanism (5); retracting the piston of the cylinder (2-2) after the pneumatic chuck (2-3) of the extracting mechanism (2) clamps an end of the handle (6-3) and extracting the handle (6-3) axially from the connecting rod (6-2); and moving the axial feeding mechanism (5) backward to an initial position.

* * * * *